(12) United States Patent
Bourdelais et al.

(10) Patent No.: US 6,180,227 B1
(45) Date of Patent: Jan. 30, 2001

(54) DIGITAL CLEAR DISPLAY MATERIAL WITH BLUING TINT

(75) Inventors: Robert P. Bourdelais, Pittsford; Peter T. Aylward; Thomas M. Laney, both of Hilton; Alphonse D. Camp, Rochester, all of NY (US)

(73) Assignee: Eastman Kodak Company, Rochester, NY (US)

( * ) Notice: Under 35 U.S.C. 154(b), the term of this patent shall be extended for 0 days.

(21) Appl. No.: 09/217,751

(22) Filed: Dec. 21, 1998

(51) Int. Cl.$^7$ ............................ B32B 27/08; B32B 27/32; B32B 27/36

(52) U.S. Cl. ..................... 428/339; 428/195; 428/475.2; 428/478.2; 428/480; 428/483; 428/910; 428/914; 428/337; 428/332

(58) Field of Search ............................... 428/195, 206, 428/480, 483, 910, 914, 332, 337, 475.2, 478.2, 339; 430/523, 527, 531, 533, 534

(56) References Cited

U.S. PATENT DOCUMENTS

| | | | |
|---|---|---|---|
| 4,234,644 | * 11/1980 | Blake et al. | 428/204 |
| 4,259,422 | * 3/1981 | Davidson et al. | 430/17 |
| 4,701,369 | 10/1987 | Duncan . | |
| 4,701,370 | 10/1987 | Park . | |
| 5,084,334 | 1/1992 | Hamano et al. . | |
| 5,141,685 | 8/1992 | Maier et al. . | |
| 5,143,765 | 9/1992 | Maier et al. . | |
| 5,223,383 | 6/1993 | Maier et al. . | |
| 5,275,854 | 1/1994 | Maier et al. . | |
| 5,395,677 | * 3/1995 | Harada et al. | 428/195 |
| 5,422,175 | 6/1995 | Ito et al. . | |
| 5,437,913 | * 8/1995 | Asaka et al. | 428/195 |
| 5,612,283 | * 3/1997 | Campbell | 503/227 |
| 5,853,965 | 12/1998 | Haydock et al. . | |
| 5,866,282 | 2/1999 | Bourdelais et al. . | |
| 5,874,205 | 2/1999 | Bourdelais et al. . | |
| 5,885,698 | * 3/1999 | Takahana et al. | 428/212 |
| 6,048,606 | * 4/2000 | Bourdelais et al. | 428/304.4 |

FOREIGN PATENT DOCUMENTS

| | | |
|---|---|---|
| 0 470 760 A2 | 2/1992 | (EP) . |
| 0 880 065 A1 | 11/1998 | (EP) . |
| 0 880 067 A1 | 11/1998 | (EP) . |
| 0 880 069 A1 | 11/1998 | (EP) . |
| 2 215 268 | 9/1989 | (GB) . |
| 2 325 749 | 12/1998 | (GB) . |
| 2 325 750 | 12/1998 | (GB) . |

OTHER PUBLICATIONS

Japanese Abstract 85/31669 w/claims.
Japanese Abstract 5,057,836, 1993.
Japanese Abstract 7,137,216, 1995 w/claim.

* cited by examiner

*Primary Examiner*—Vivian Chen
(74) *Attorney, Agent, or Firm*—Paul A. Leipold

(57) ABSTRACT

The invention relates to an imaging member comprising at least one image receiving layer and an integral base material comprising at least one polyester layer and an upper surface layer comprising a polyester or polyolefin polymer and a bluing tint wherein said integral base material has a spectral transmission of greater than 90%.

36 Claims, No Drawings

DIGITAL CLEAR DISPLAY MATERIAL WITH BLUING TINT

FIELD OF THE INVENTION

This invention relates to imaging materials. In a preferred form it relates to base materials for digital clear display materials that do not have incorporated diffuser layers.

BACKGROUND OF THE INVENTION

It is known in the art that photographic display materials are utilized for advertising as well as decorative displays of photographic images. Since these display materials are used in advertising, the image quality of the display material is critical in expressing the quality message of the product or service being advertised. Furthermore, a photographic display image needs to be high impact, as it attempts to draw consumer attention to the display material and the desired message being conveyed. Typical applications for display material include product and service advertising in public places such as airports, buses and sports stadiums, movie posters and fine art photography. The desired attributes of a quality, high impact photographic display material are a slight blue density minimum, durability, sharpness and flatness. Cost is also important as display materials tend to be expensive compared with alternative display material technology mainly lithographic images on paper. For display materials, traditional color paper is undesirable as it suffers from a lack of durability for the handling, photographic processing and display of large format images.

In the formation of color paper it is known that the base paper has applied thereto a layer of polymer, typically polyethylene. This layer serves to provide waterproofing to the paper, as well as providing a smooth surface on which the photosensitive layers are formed. The formation of a suitably smooth surface is difficult requiring great care and expense to ensure proper laydown and cooling of the polyethylene layers. The formation of a suitably smooth surface would also improve image quality as the display material would have more apparent blackness as the reflective properties of the improved base are more specular than the prior materials. As the whites are whiter and the blacks are blacker, there is more range in between and, therefore, contrast is enhanced. It would be desirable if a more reliable and improved surface could be formed at less expense.

Prior art photographic reflective papers comprise a melt extruded polyethylene layer which also serves as a carrier layer for optical brightener and other whitener materials as well as tint materials. It would be desirable if the optical brightener and tints, rather than being dispersed a single melt extruded layer of polyethylene could be concentrated nearer the surface where they would be more effective optically.

Prior art photographic clear display materials have light sensitive silver halide emulsions coated directly onto a gelatin coated clear polyester sheet. Clear photographic display materials are typically used as overhead materials that are projected on a screen, typically a highly reflective and white and display materials that utilize light boxes with a white diffuser screen. Diffuser screens are necessary to diffuse the light source used to backlight clear display materials and to provide the white portion of the image. Without a diffuser, the light source would significantly reduce the quality of the image. Since light sensitive silver halide emulsions that are used for prior art clear display materials tend to be yellow because of the gelatin used as a binder for photographic emulsions, the minimum density areas of a developed image will tend to appear as a yellow white. A yellow white reduces the commercial value of a transmission display material because the imaging viewing public associates image quality with a blue white. It would be desirable if a clear display material could have a more blue white.

Prior art photographic display material use polyester as a base for the support. Typically the polyester support is from 150 to 250 μm thick to provide the required stiffness. A thinner base material would be lower in cost and allow for roll handling efficiency as the rolls would weigh less and be smaller in diameter. It would be desirable to use a base material that had the required stiffness but was thinner to reduce cost and improve roll handling efficiency.

Prior art photographic clear display materials, while providing excellent image quality, tend to be expensive when compared with other quality imaging technologies such as ink jet imaging, thermal dye transfer imaging, and gravure printing. Since photographic clear display materials require an additional imaging processing step compared to alternate quality imaging systems, the cost of clear photographic display materials can be higher than other quality imaging systems. The processing equipment investment required to process photographic transmission display materials also requires consumers to typically interface with a commercial processing lab increasing time to image. It would be desirable if a high quality clear display support could utilize nonphotographic quality imaging technologies.

Prior art clear base materials for digital printing technologies such as ink jet or thermal dye transfer printing utilize a gelatin coated transparent polyester sheet. Prior art digital transparent polyester sheet tends to be yellow because of the gelatin used as a binder for image receiving layers, the minimum density areas of a developed image will tend to appear as a yellow.

Prior art clear digital display materials typically are image receiving layers coated on a transparent primed polyester sheet. The extra priming operation is expensive as it requires an additional operation and expensive priming materials.

PROBLEM TO BE SOLVED BY THE INVENTION

There is a need for clear display materials that provide improved transmission of light while, at the same time, reducing the yellowness of the density minimum areas of the image.

SUMMARY OF THE INVENTION

It is an object of the invention to provide improved clear display materials.

It is another object to provide display materials that are lower in cost, as well as providing sharp durable images.

It is a further object to provide a clear display materials with a clear density minimum.

It is another object to provide a clear display material that utilizes nonphotographic imaging technology.

It is an another object to provide a product that may be provided with a digital image on each side.

These and other objects of the invention are accomplished by a imaging member comprising at least one image receiving layer and an integral base material comprising at least one polyester layer and an upper surface layer comprising a polyester or polyolefin polymer and a bluing tint wherein said integral base material has a spectral transmission of greater than 90%.

ADVANTAGEOUS EFFECT OF THE INVENTION

The invention provides whiter images by off setting the yellowness of the digital image receiving layer.

DETAILED DESCRIPTION OF THE INVENTION

The invention has numerous advantages over prior clear display materials and methods of imaging transmission display materials. The display materials of the invention provide transmission of a high percentage of the light. The material as it contains in its preferred form digital imaging layers on both sides of a polymer sheet. The materials are low in cost as the transparent polymer material sheet is thinner than in prior products. The minimum density areas of the clear display material of the invention will appear whiter to the observer than prior art materials which have a tendency to appear somewhat yellow as the image receiving layers used for clear display materials have a native yellowness.

The transmission display support contains an integral imaging receiver adhesion layer with avoids the need for expensive primer coatings that are necessary when for example gelatin based ink jet receiving layers are coated on polyester. Because nonphotographic imaging systems are used to image the support, the display materials are more assessable to the consumer as digital printing systems such as ink jet or thermal dye transfer are widely available and low in cost for small volume. Finally, since the imaging technology used in this invention does not require wet chemistry processing of images, the environmental problems associated with the use and disposal of processing chemicals are avoided. These and other advantages will be apparent from the detailed description below.

The terms as used herein, "top", "upper", "emulsion side", and "face" mean the side or toward the side of the layer containing blue tint in the biaxially oriented sheet. The terms "bottom", "lower side", and "back" mean the side opposite of the layer containing the blue tint. The term as used herein, "transparent" means the ability to pass radiation without significant deviation or absorption. For this invention, "transparent" material is defined as a material that has a spectral transmission greater than 90%. For a photographic element, spectral transmission is the ratio of the transmitted power to the incident power and is expressed as a percentage as follows; $T_{RGB}=10^{-D}*100$ where D is the average of the red, green and blue Status A transmission density response measured by an X-Rite model 310 (or comparable) photographic transmission densitometer. The term as used herein, "duplitized" element means elements with image receiving layers on the top side and the bottom side of the imaging support.

The layers of the biaxially oriented polymer sheet of this invention have levels of colorants and optical brightener adjusted to provide optimum transmission properties and color correction for the native yellowness of the gelatin used in image receiving layers. A blue tint is added to a thin layer polyolefin layer on the biaxially oriented sheet that corrects the native yellowness of the gelatin. Optical brightener is also added to the thin layer of polyolefin on the biaxially oriented sheet to provide additional blue correction when the display material is illuminated by a light source. The biaxially oriented polymer sheet is coextruded as a multi layer integral substrate of sufficient thickness for stiffness required for efficient image processing as well as product handling and display. An important aspect of this invention is that the imaging member is coated with a image receiving layers on the top side and the bottom side. This duplitized image receiving layer combined with the optical properties of the biaxially oriented sheet provides an improved imaging display material. The invention material differs from prior art polyester digital image bases in that the invention contains the integral image receiving adhesion layer and chemistry to correct for the yellowness of the image receiving layer chemistry.

The polyester sheet of this invention preferably has a coextruded integral imaging receiving adhesion layer. Beyond the transparent layer and the voided layer, a coextruded polyethylene layer can be used with corona discharge treatment as an ink jet adhesion layer, avoiding the need for a primer coating common with polyester sheets. A polyethylene layer with corona discharge treatment is preferred because gelatin based ink jet receiving layers adhere well to polyethylene without the need for primer coatings. An additional example of an integral imaging receiving adhesion layer is a thin layer of biaxially oriented polycarbonate allows a solvent based polycarbonate dye receiver layer typical of thermal dye transfer imaging to adhere to the base without an expensive primer coating.

Any suitable biaxially oriented polymer sheet may be utilized for the top layer of the invention. The core of the preferred integral sheet should be from 15 to 95% of the total thickness of the sheet, preferably from 30 to 85% of the total thickness. The skin(s) should thus be from 5 to 85% of the sheet, preferably from 15 to 70% of the thickness. The total thickness of the integral sheet can range from 76 to 256 $\mu$m, preferably from 76 to 200 $\mu$m. Below 76 $\mu$m, the biaxially oriented sheet may not be thick enough to minimize any inherent non-planarity in the support and would be more difficult to manufacture. At thickness higher than 256 $\mu$m, little improvement in either surface smoothness or mechanical properties are seen, and so there is little justification for the further increase in cost for extra materials. In the preferred embodiment a imaging member comprising at least one image receiving layer and an integral base material comprising at least one polyester layer and an upper surface layer comprising a polyester or polyolefin polymer and a bluing tint wherein said integral base material has a spectral transmission of greater than 90% and an imaging member that has a thickness of between 76 and 256 $\mu$m.

For the biaxially oriented sheet, suitable classes of thermoplastic polymers for the biaxially oriented sheet and the core matrix-polymer of the preferred composite sheet comprise polyesters. Suitable polyester include polyethylene terephthalate, modified polyethylene terephthalate, polybutylene terephthalate, copolyester such as poly(1,4-cyclohexylene dimethylene) terephthalate. Suitable polyolefins include polypropylene, polyethylene, polymethylpentene, polystyrene, polybutylene and mixtures thereof.

The skin layers of the composite sheet can be made of polyolefin materials such as polyolefin copolymers, including copolymers of propylene and ethylene such as hexene, butene, and octene are also useful. Polyethylene is preferred, as it is low in cost and has desirable strength properties and generally has excellent adhesion to gelatin based light sensitive emulsions.

The total thickness of the top most skin layer of the biaxially oriented sheet of this invention should be between 0.20 $\mu$m and 1.5 $\mu$m, preferably between 0.5 and 1.0 $\mu$m. Below 0.5 $\mu$m any inherent non-planarity in the coextruded skin layer may result in unacceptable color variation. At thickness greater that 1.0 $\mu$m there is also a greater material volume to filter for contamination such as clumps, poor color pigment dispersion, or contamination. Low density polyethylene with a density of 0.88 to 0.94 g/cc is the preferred material for the top skin because current emulsion formulation adhere well to low density polyethylene compared to other materials such as polypropylene and high density polyethylene.

Addenda may be added to the top most skin layer to change the color of the imaging element. For imaging use, a clear base with a slight bluish tinge is preferred. The addition of the slight bluish tinge may be accomplished by any process which is known in the art including the machine blending of color concentrate prior to extrusion and the melt extrusion of blue colorants that have been pre-blended at the desired blend ratio. Colored pigments that can resist extrusion temperatures greater than 320° C. are preferred as temperatures greater than 320° C. are necessary for coextrusion of the skin layer. Blue colorants used in this invention may be any colorant that does not have an adverse impact on the imaging element. Preferred blue colorants include Phthalocyanine blue pigments, Cromophtal blue pigments, Irgazin blue pigments, Irgalite organic blue pigments and pigment Blue 60.

It has been found that a very thin polyolefin layer (0.2 to 1.5 µm) on the surface immediately below the emulsion layer can be made by coextrusion and subsequent stretching in the width and length direction. It has been found that this polyolefin layer is, by nature, extremely accurate in thickness and when blue tints are added, can be used to provide all the color corrections which are usually distributed throughout the thickness of the sheet between the emulsion and the transparent base. This topmost layer is so efficient that the total colorants needed to provide a correction are less than one-half the amount needed if the colorants are dispersed throughout thickness of the biaxially oriented sheet. Colorants are often the cause of spot defects due to clumps and poor dispersions. Spot defects which are defects that can cause undesirable density differences in the developed image, decrease the commercial value of images. The spot defects are improved with this invention because less colorant is used and high quality filtration to clean up the colored layer is much more feasible since the total volume of polymer with colorant is only typically 2 to 10 percent of the total polymer between the base paper and the photosensitive layer.

Addenda may be added to the biaxially oriented sheet of this invention so that when the biaxially oriented sheet is viewed by the intended audience, the imaging element emits light in the visible spectrum when exposed to ultraviolet radiation. Emission of light in the visible spectrum allows for the support to have a desired background color in the presence of ultraviolet energy. This is particularly useful when images are backlit with a light source that contains ultraviolet energy and may be used to optimize image quality for transmission display applications.

Addenda known in the art to emit visible light in the blue spectrum are preferred. Consumers generally prefer a slight blue tint to white defined as a negative b* compared to a white defined as a b* within one b* unit of zero. b* is the measure of yellow/blue in CIE space. A positive b* indicates yellow while a negative b* indicates blue. The addition of addenda that emits in the blue spectrum allows for tinting the support without the addition of colorants which would decrease the whiteness of the image. The preferred emission is between 1 and 5 delta b* units. Delta b* is defined as the b* difference measured when a sample is illuminated ultraviolet light source and a light source without any significant ultraviolet energy. Delta b* is the preferred measure to determine the net effect of adding an optical brightener to the top biaxially oriented sheet of this invention. Emissions less than 1 b* unit can not be noticed by most customers therefore is it not cost effective to add optical brightener to the biaxially oriented sheet. An emission greater that 5 b* units would interfere with the color balance of the prints making the whites appear too blue for most consumers.

The preferred addenda to a imaging member comprising at least one photosensitive layer and an integral base material comprising at least one polyester layer and an upper surface layer comprising a polyester or polyolefin polymer and a bluing tint wherein said integral base material has a spectral transmission of greater than 90% is an optical brightener. An optical brightener is substantially colorless, fluorescent, organic compound that absorbs ultraviolet light and emits it as visible blue light. Examples include but are not limited to derivatives of 4,4'-diaminostilbene-2,2'-disulfonic acid, coumarin derivatives such as 4-methyl-7-diethylaminocoumarin, 1-4-Bis (O-Cyanostyryl) Benzol and 2-Amino-4-Methyl Phenol. An unexpected desirable feature of this efficient use of optical brightener is explained as follows: because the ultraviolet source for a transmission display material is on the opposite side of the image, the ultraviolet light intensity is not reduced by ultraviolet filters common to imaging layers. The result is less optical brightener is required to achieve the desired background color.

The optical brightener may be added to any layer in the multilayer coextruded biaxially oriented polymer sheet. The preferred location is adjacent to or in the exposed surface layer of said sheet. This allows for the efficient concentration of optical brightener which results in less optical brightener being used when compared to traditional display supports. When the desired weight % loading of the optical brightener begins to approach the concentration at which the optical brightener migrates to the surface of the support forming crystals in the imaging layer, the addition of optical brightener into the layer adjacent to the exposed layer is preferred. In this case, the migration from the layer adjacent to the exposed layer is significantly reduced allowing for much higher optical brightener levels to be used to optimize image quality. Locating the optical brightener in the layer adjacent to the exposed layer allows for a less expensive optical brightener to be used as the exposed layer, which is substantially free of optical brightener, prevents significant migration of the optical brightener. Another preferred method to reduce unwanted optical brightener migration is to use polypropylene for the layer adjacent to the exposed surface. Since optical brightener is more soluble in polypropylene than polyethylene, the optical brightener is less likely to migrate from polypropylene.

An imaging member comprising at least one image receiving layer and an integral base material comprising at least one polyester layer and an upper surface layer comprising a polyester or polyolefin polymer and a bluing tint wherein said integral base material has a spectral transmission of greater than 90% should be substantially free of inorganic pigments such as white pigments. White pigments such as $TiO_2$ or colorants with large particles added to the polymer sheet tend to scatter light and reduce the spectral transmission of the support. Light scattering and a reduction in spectral transmission are undesirable for a clear display material. Small amounts of tints and optical brightener may be added but care needs to be taken to prevent unwanted light scattering.

The preferred spectral transmission of the imaging element of this invention is at least 90%. Spectral transmission is the amount of light energy that is transmitted through a material. For a photographic element, spectral transmission is the ratio of the transmitted power to the incident power and is expressed as a percentage as follows;

$T_{RGB}=10^{-D}*100$ where D is the average of the red, green and blue Status A transmission density response measured by an X-Rite model 310 (or comparable) photographic transmission densitometer. The higher the transmission, the less opaque the material. For a clear display material, the quality of the image is related to the amount of light transmitted through the image. A clear display image with a low amount of spectral transmission does not allow sufficient illumination of the image causing a perceptual loss in image quality. A transmission image with a spectral transmission of less than 85% is unacceptable for a clear display material as the quality of the image can not match prior art clear display materials.

The most preferred spectral transmission density for the imaging element of this invention is between 92% and 98%. This range allows for optimization of transmission properties to create a clear display material that can be used as an overhead or display material in combination with a light box and diffuser screen.

The coextrusion, quenching, orienting, and heat setting of these composite sheets may be effected by any process which is known in the art for producing oriented sheet, such as by a flat sheet process or a bubble or tubular process. The flat sheet process involves extruding the blend through a slit die and rapidly quenching the extruded web upon a chilled casting drum so that the core matrix polymer component of the sheet and the skin components(s) are quenched below their glass solidification temperature. The quenched sheet is then biaxially oriented by stretching in mutually perpendicular directions at a temperature above the glass transition temperature, below the melting temperature of the matrix polymers. The sheet may be stretched in one direction and then in a second direction or may be simultaneously stretched in both directions. A stretching ratio, defined as the final length divided by the original length for sum of the machine and cross directions, of at least 10 to 1 is preferred. After the sheet has been stretched, it is heat set by heating to a temperature sufficient to crystallize or anneal the polymers while restraining to some degree the sheet against retraction in both directions of stretching.

The coextruded sheet, while described as having preferably at least two layers, may also be provided with additional layers that may serve to change the properties of the biaxially oriented sheet. Biaxially oriented sheets could be formed with surface layers that would provide an improved adhesion, or look to the support and imaging element. The biaxially oriented extrusion could be carried out with as many as 10 layers if desired to achieve some particular desired property.

These coextruded sheets may be coated or treated after the coextrusion and orienting process or between casting and full orientation with any number of coatings which may be used to improve the properties of the sheets including printability, to provide a vapor barrier, to make them heat sealable, or to improve the adhesion to the support or to the photo sensitive layers. Examples of this would be acrylic coatings for printability, coating polyvinylidene chloride for heat seal properties.

The structure of a preferred biaxially oriented sheet where the exposed surface layer is adjacent to the imaging layer is as follows:
Polyethylene skin with blue pigments
Transparent polyester with optical brightener Polyester sheets are particularly advantageous because they provide excellent strength and dimensional stability. Such transparent polyester sheets are well known, widely used and typically prepared from high molecular weight polyesters prepared by condensing a dihydric alcohol with a dibasic saturated fatty acid or derivative thereof.

Suitable dihydric alcohols for use in preparing such polyesters are well known in the art and include any glycol wherein the hydroxyl groups are on the terminal carbon atom and contain from two to twelve carbon atoms such as, for example, ethylene glycol, propylene glycol, trimethylene glycol, hexamethylene glycol, decamethylene glycol, dodecamethylene glycol, 1,4-cyclohexane, dimethanol, and the like.

Suitable dibasic acids useful for the preparation of polyesters include those containing from two to sixteen carbon atoms such as adipic acid, sebacic acid, isophthalic acid, terephtalic acid and the like. Alkyl esters of acids such as those listed above can also be employed. Other alcohols and acids as well as polyesters prepared therefrom and the preparation of the polyesters are described in U.S. Pat. Nos. 2,720,503 and 2,901,466. Polyethylene terephthalate is preferred.

Polyester support thickness can range from about 15 millinewtons to 100 millinewtons. The preferred stiffness is between 20 and 100 millinewtons. Polyester stiffness less than 15 millinewtons does not provide the required stiffness for display materials in that they will be difficult to handle and do not lay flat for optimum viewing. Polyester stiffness greater than 100 millinewtons begins to exceed the stiffness limit for processing equipment and has no performance benefit for the display materials.

Generally polyester films supports are prepared by melt extruding the polyester through a slit die, quenching to the amorphous state, orienting by machine and cross direction stretching and heat setting under dimensional restraint. The polyester film can also be subjected to a heat relaxation treatment to improve dimensional stability and surface smoothness.

The polyester film will typically contain an undercoat or primer layer on both sides of the polyester film. Subbing layers used to promote adhesion of coating compositions to the support are well known in the art and any such material can be employed. Some useful compositions for this purpose include interpolymers of vinylidene chloride such as vinylidene chloride/methyl acrylate/itaconic acid terpolymers or vinylidene chloride/acrylonitrile/acrylic acid terpolymers, and the like. These and other suitable compositions are described, for example, in U.S. Pat. Nos. 2,627,088; 2,698,240; 2,943,937; 3,143,421; 3,201,249; 3,271,178; 3,443,950; 3,501,301. The polymeric subbing layer is usually overcoated with a second subbing layer comprised of gelatin, typically referred to as gel sub. In a preferred embodiment a imaging member comprising at least one photosensitive layer and an integral base material comprising at least one polyester layer and an upper surface layer comprising a polyester or polyolefin polymer and a bluing tint wherein said integral base material has a spectral transmission of greater than 90% further comprises at least one subbing layer. In another embodiment of said imaging member the integral base member comprises a bottom layer of polyethylene. In this case there is no need for a subbing layer to provide the necessary adhesion to the support.

A transparent polymer base free of $TiO_2$ is preferred because the $TiO_2$ in the transparent polymer reduces the % transmission of the imaging element and gives the clear display materials an undesirable opalescence appearance. The $TiO_2$ also gives the transparent polymer support a slight yellow tint which is undesirable for a digital clear display material.

For the preferred clear display material of this invention, an imaging member comprising at least one image receiving layer and an integral base material comprising at least one polyester layer and an upper surface layer comprising a polyester or polyolefin polymer and a bluing tint wherein said integral base material has a spectral transmission of greater than 90%. Said imaging member comprises an integral base material that is oriented wherein said upper polymer layer comprises at least one polyethylene layer. Polyethylene is preferred because it is low in cost and also provides good adhesion to the photosensitive layers. In another embodiment, the imaging member comprising at least one image receiving layer and an integral base material comprising at least one polyester layer and an upper surface layer comprising a polyester or polyolefin polymer and a bluing tint wherein said integral base material has a spectral transmission of greater than 90% and further comprises at least one gel subbing layer.

The imaging member of a preferred embodiment comprises at least one image receiving layer on each the top and bottom of said member.

Applying the imaging layer to either the top or bottom is suitable for a digital clear display material, however it is not sufficient to create a digital clear material that is optimum. For the display material of this invention, at least one image layer comprises at least image receiving layer on each of the top and bottom of the imaging support of this invention is most preferred. Applying an image layer to both the top and bottom of the support allows for optimization of transmission image dye density as a heavy dye or ink coverage is required for a quality image. For some markets improved image quality requires an increase in dye density. Providing all of the required ink or dye density on one side for a high quality transmission density is difficult because of the current limitations in dye or ink laydown utilizing digital printing techniques. An example would be ink jet printing where a maximum ink laydown is achieved before optimum image quality as the ink required for a high quality image would be difficult to dry and mordant in the image receiving layer. By duplitizing the image receiving layer, typical dye densities can be printed on each side achieving a high quality, high density image.

As used herein, the phrase "imaging element" is a material that utilizes nonphotograpahic technology in the formation of images. The imaging elements can be black-and-white, single color elements, or multicolor elements. Nonphotograpahic imaging methods include thermal dye transfer, ink jet, electrophotographic, electrographic, flexographic printing, or rotogravure printing. The imaging layers are preferably applied to the top of the imaging support.

The thermal dye image-receiving layer of the receiving elements of the invention may comprise, for example, a polycarbonate, a polyurethane, a polyester, polyvinyl chloride, poly(styrene-co-acrylonitrile), poly(caprolactone), or mixtures thereof. The dye image-receiving layer may be present in any amount which is effective for the intended purpose. In general, good results have been obtained at a concentration of from about 1 to about 10 g/m$^2$. An overcoat layer may be further coated over the dye-receiving layer, such as described in U.S. Pat. No. 4,775,657 of Harrison et al.

Dye-donor elements that are used with the dye-receiving element of the invention conventionally comprise a support having thereon a dye containing layer. Any dye can be used in the dye-donor employed in the invention provided it is transferable to the dye-receiving layer by the action of heat. Especially good results have been obtained with sublimable dyes. Dye donors applicable for use in the present invention are described, e.g., in U.S. Pat. Nos. 4,916,112; 4,927,803; and 5,023,228.

As noted above, dye-donor elements are used to form a dye transfer image. Such a process comprises image-wise-heating a dye-donor element and transferring a dye image to a dye-receiving element as described above to form the dye transfer image.

In a preferred embodiment of the thermal dye transfer method of printing, a dye donor element is employed which comprises a poly-(ethylene terephthalate) support coated with sequential repeating areas of cyan, magenta, and yellow dye, and the dye transfer steps are sequentially performed for each color to obtain a three-color dye transfer image. Of course, when the process is only performed for a single color, then a monochrome dye transfer image is obtained.

Thermal printing heads which can be used to transfer dye from dye-donor elements to receiving elements of the invention are available commercially. There can be employed, for example, a Fujitsu Thermal Head (FTP-040 MCS001), a TDK Thermal Head F415 HH7-1089, or a Rohm Thermal Head KE 2008-F3. Alternatively, other known sources of energy for thermal dye transfer may be used, such as lasers as described in, for example, GB 2,083,726A.

A thermal dye transfer assemblage of the invention comprises (a) a dye-donor element, and (b) a dye-receiving element as described above, the dye-receiving element being in a superposed relationship with the dye-donor element so that the dye layer of the donor element is in contact with the dye image-receiving layer of the receiving element.

When a three-color image is to be obtained, the above assemblage is formed on three occasions during the time when heat is applied by the thermal printing head. After the first dye is transferred, the elements are peeled apart. A second dye-donor element (or another area of the donor element with a different dye area) is then brought in register with the dye-receiving element and the process repeated. The third color is obtained in the same manner.

The electrographic and electrophotographic processes and their individual steps have been well described in detail in many books and publications. The processes incorporate the basic steps of creating an electrostatic image, developing that image with charged, colored particles (toner), optionally transferring the resulting developed image to a secondary substrate, and fixing the image to the substrate. There are numerous variations in these processes and basic steps; the use of liquid toners in place of dry toners is simply one of those variations.

The first basic step, creation of an electrostatic image, can be accomplished by a variety of methods. The electrophotographic process of copiers uses imagewise photodischarge, through analog or digital exposure, of a uniformly charged photoconductor. The photoconductor may be a single-use system, or it may be rechargeable and reimageable, like those based on selenium or organic photoreceptors.

In one form of the electrophotographic process copiers use imagewise photodischarge, through analog or digital exposure, of a uniformly charged photoconductor. The photoconductor may be a single-use system, or it may be rechargeable and reimageable, like those based on selenium or organic photoreceptors.

In one form of the electrophotographic process, a photosensitive element is permanently imaged to form areas of differential conductivity. Uniform electrostatic charging, followed by differential discharge of the imaged element, creates an electrostatic image. These elements are called electrographic or xeroprinting masters because they can be repeatedly charged and developed after a single imaging exposure.

In an alternate electrographic process, electrostatic images are created iono-graphically. The latent image is created on dielectric (charge-holding) medium, either paper or film. Voltage is applied to selected metal styli or writing nibs from an array of styli spaced across the width of the medium, causing a dielectric breakdown of the air between the selected styli and the medium. Ions are created, which form the latent image on the medium.

Electrostatic images, however generated, are developed with oppositely charged toner particles. For development with liquid toners, the liquid developer is brought into direct contact with the electrostatic image. Usually a flowing liquid is employed to ensure that sufficient toner particles are available for development. The field created by the electrostatic image causes the charged particles, suspended in a nonconductive liquid, to move by electrophoresis. The charge of the latent electrostatic image is thus neutralized by the oppositely charged particles. The theory and physics of electrophoretic development with liquid toners are well described in many books and publications.

If a reimageable photoreceptor or an electrographic master is used, the toned image is transferred to paper (or other substrate). The paper is charged electrostatically, with the polarity chosen to cause the toner particles to transfer to the paper. Finally, the toned image is fixed to the paper. For self-fixing toners, residual liquid is removed from the paper by air-drying or heating. Upon evaporation of the solvent, these toners form a film bonded to the paper. For heat-fusible toners, thermoplastic polymers are used as part of the particle. Heating both removes residual liquid and fixes the toner to paper.

The dye receiving layer or DRL for ink jet imaging may be applied by any known methods, such as solvent coating, or melt extrusion coating techniques. The DRL is coated over the tie layer (TL) at a thickness ranging from 0.1–10 $\mu$m, preferably 0.5–5 $\mu$m. There are many known formulations which may be useful as dye receiving layers. The primary requirement is that the DRL is compatible with the inks which it will be imaged so as to yield the desirable color gamut and density. As the ink drops pass through the DRL, the dyes are retained or mordant in the DRL, while the ink solvents pass freely through the DRL and are rapidly absorbed by the TL. Additionally, the DRL formulation is preferably coated from water, exhibits adequate adhesion to the TL, and allows for easy control of the surface gloss.

For example, Misuda et al. in U.S. Pat. Nos. 4,879,166; 5,264,275; 5,104,730; 4,879,166; and Japanese patents 1,095,091; 2,276,671; 2,276,670; 4,267,180; 5,024,335; and 5,016,517, discloses aqueous based DRL formulations comprising mixtures of psuedo-bohemite and certain water soluble resins. Light, in U.S. Pat. Nos. 4,903,040; 4,930,041; 5,084,338; 5,126,194; 5,126,195; and 5,147,717 discloses aqueous-based DRL formulations comprising mixtures of vinyl pyrrolidone polymers and certain water-dispersible and/or water-soluble polyesters, along with other polymers and addenda. Butters et al. in U.S. Pat. Nos. 4,857,386 and 5,102,717, disclose ink-absorbent resin layers comprising mixtures of vinyl pyrrolidone polymers and acrylic or methacrylic polymers. Sato et al. in U.S. Pat. No. 5,194,317 and Higuma, et al. in U.S. Pat. No. 5,059,983 disclose aqueous-coatable DRL formulations based on poly (vinyl alcohol). Iqbal, in U.S. Pat. No. 5,208,092 discloses water-based IRL formulations comprising vinyl copolymers which are subsequently cross-linked. In addition to these examples, there may be other known or contemplated DRL formulations which are consistent with the aforementioned primary and secondary requirements of the DRL, all of which fall under the spirit and scope of the current invention.

The preferred DRL is a 0.1–10 mm DRL which is coated as an aqueous dispersion of 5 parts alumoxane and 5 parts poly (vinyl pyrrolidone). The DRL may also contain varying levels and sizes of matting agents for the purpose of controlling gloss, friction, and/or fingerprint resistance, surfactants to enhance surface uniformity and to adjust the surface tension of the dried coating, mordanting agents, antioxidants, UV absorbing compounds, light stabilizers, and the like.

Although the ink-receiving elements as described above can be successfully used to achieve the objectives of the present invention, it may be desirable to overcoat the DRL for the purpose of enhancing the durability of the imaged element. Such overcoats may be applied to the DRL either before or after the element is imaged. For example, the DRL can be overcoated with an ink-permeable layer through which inks freely pass. Layers of this type are described in U.S. Pat. Nos. 4,686,118; 5,027,131; and 5,102,717. Alternatively, an overcoat may be added after the element is imaged. Any of the known laminating films and equipment may be used for this purpose. The inks used in the aforementioned imaging process are well known, and the ink formulations are often closely tied to the specific processes, i.e., continuous, piezoelectric, or thermal. Therefore, depending on the specific ink process, the inks may contain widely differing amounts and combinations of solvents, colorants, preservatives, surfactants, humectants, and the like. Inks preferred for use in combination with the image recording elements of the present invention are water-based, such as those currently sold for use in the Hewlett-Packard Desk Writer 560C printer. However, it is intended that alternative embodiments of the image-recording elements as described above, which may be formulated for use with inks which are specific to a given ink-recording process or to a given commercial vendor, fall within the scope of the present invention.

Printing generally accomplished by Flexographic or Rotogravure. Flexography is an offset letterpress technique where the printing plates are made from rubber or photopolymers. The printing is accomplished by the transfer of the ink from the raised surface of the printing plate to the support of this invention. The Rotogravure method of printing uses a print cylinder with thousands of tiny cells which are below the surface of the printing cylinder. The ink is transferred from the cells when the print cylinder is brought into contact with the web at the impression roll.

Suitable inks for this invention include solvent based inks, water based inks, and radiation cured inks. Examples of solvent based inks include nitrocellulose maleic, nitrocellulose polyamide, nitrocellulose acrylic, nitrocellulose urethane, chlorinated rubber, vinyl, acrylic, alcohol soluble acrylic, cellulose acetate acrylic styrene, and other synthetic polymers. Examples of water based inks include acrylic emulsion, maleic resin dispersion, styrene maleic anhydride resins, and other synthetic polymers. Examples of radiation cured inks include ultraviolet and electron beam cure inks.

When the support of this invention is printed with Flexographic or Rotogravure inks, a ink adhesion coating may be required to allow for efficient printing of the support. The top layer of the biaxially oriented sheet may be coated with any materials known in the art to improve ink adhesion to biaxially oriented polyolefin sheets of this invention. Examples include acrylic coatings and polyvinyl alcohol coatings. Surface treatments to the biaxially oriented sheets of this invention may also be used to improve ink adhesion. Examples include corona and flame treatment.

The following examples illustrate the practice of this invention. They are not intended to be exhaustive of all possible variations of the invention. Parts and percentages are by weight unless otherwise indicated.

EXAMPLES

Example 1

In this example the invention was compared to a prior art photographic clear display material. The invention was a duplitized support containing a biaxially oriented sheet of transparent polyester base with a thin skin layer of clear ethylene polymer with blue tint and optical brightener. The prior art material and the invention were measured for % transmission, lightness, color and stiffness. This example will show that the image formed on the polyester base of this invention was an acceptable transmission display image as measured by several image quality parameters critical for transmission display images. Further, several advantages resulting from utilizing nonphotographic imaging methods will be obvious.

The following prior art clear display material was used as a comparison for the invention:

Kodak DuraClear (Eastman Kodak Co.), is a one side color silver halide coated polyester support that is 180 μm thick. The support is a clear gel subbed polyester.

The following coextruded biaxially oriented photographic clear display material was prepared by extrusion casting and then orienting in the machine direction and then orienting in the cross direction a two layer sheet of polymer.
Top Layer (Top Emulsion side):

Low density polyethylene (Eastman 4002P) was compounded with a blue tint and optical brightener and then formed integrally with a bottom layer of polyester by coextrusion and melt casting onto a chill roller and then biaxially orienting. Said top layer was 0.75 μm thick.
Bottom Layer (Bottom Emulsion Side):

The bottom layer was a clear polyethylene terephthalate base that was approximately 175 μm thick. The bottom most side of this layer was subbed and gel coated to promote adhesion to the backside emulsion layer.

An ink jet image receiving layer was utilized to prepare the transmission display material of this example and was coated on the polyethylene skin layer on the display support. The ink jet image receiving layer was coated by means of an extrusion hopper with a dispersion containing 326.2 g of gelatin, 147 g of BVSME hardener, i.e., (bis (vinylsulfonylmethyl) ether 2% solution in water, 7.38 g of a dispersion containing 2.88 g of 11.5 mm polystyrene beads, .18 g of Dispexa (40% solution in water obtained from Allied Colloids, Inc.), and 4.32 g of water, and 3.0 g of a 20% solution in water of Surfactant 10G (nonylphenoxypolyglycidol) obtained from Olin Matheson Company. The thickness was about 5 mm (dried thickness).

Onto this layer was coated by means of an extrusion hopper an aqueous solution containing 143.5 g of a 3% solution in water of 4.42 g of hydroxypropyl cellulose (Methocel KLV100, Dow Chemical Company), 0.075 g of vanadyl sulfate, 2-hydrate obtained from Eastman Kodak Company, 0.075 g of a 20% solution in water of Surfactant 10G (nonylphenoxypolyglycidol) obtained from Olin Matheson Company, and 145.4 g of water; and 0.45 g of a 20% solution in water of Surfactant 10G (nonylphenoxypolyglycidol) obtained from Olin Matheson Company and 79.5 g of water to form an ink-receiving layer about 2 mm in thickness (dry thickness).

The structure of the ink jet clear display material of the example was the following:
Coating Format 1
Polyethylene with Blue Tints and
Optical Brightener
Transparent Polyester
Gelatin Primer
Coating Format 1

The clear display supports were measured for status A density using an X-Rite Model 310 photographic densitometer. Spectral transmission is calculated from the Status A density readings and is the ratio of the transmitted power to the incident power and is expressed as a percentage as follows; $T_{RGB}=10^{-D}*100$ where D is the average of the red, green and blue Status A transmission density response. The display material were also measured for L*, a* and b* using a Spectrogard spectrophotometer, CIE system, using illuminant D6500. The comparison data for invention and control are listed in Table 1 below.

TABLE 1

| Measure | Invention | Control |
| --- | --- | --- |
| % Transmission | 96% | 90% |
| CIE D6500 L* | 94.91 | 94.34 |
| CIE D6500 a* | −0.17 | −0.79 |
| CIE D6500 b* | −1.02 | 4.08 |

The photographic clear digital display support coated on the top and bottom sides with the ink jet image receiving coating format of this example exhibits all the properties needed for an digital clear display material. Further the digital clear display material of this example has many advantages over prior art photographic display materials. The biaxially oriented polyethylene skin layer has blue colorants adjusted to provide an improved minimum density position compared to prior art clear transmission display materials as the invention was able to overcome the native yellowness of the ink jet image receiving layers (b* for the invention was −1.02 compared to a b* of 4.08 for prior art transmission materials).

The 96% transmission for the invention compared to a percent transmission for the control of 90% provides an significantly improved transmission image. Further, concentration of the tint materials in the biaxially oriented sheet allows for improved manufacturing efficiency and lower material utilization resulting in a lower cost clear display material. The a* and L* for the invention are consistent with a high quality clear display materials.

The invention would be low in cost as a 126 μm polyester base was used in the invention compared to a 200 μm polyester typical used for prior art display materials. The integral imaging receiving adhesion layer provided excellent adhesion between the ink jet receiving layer and the base material without the need for expensive priming. Finally, because ink jet printing technology was utilized to form the images, the images was printed in 24 minutes compared to a typical time to image of several days for photographic transmission display materials.

The invention has been described in detail with particular reference to preferred embodiments thereof, but it will be understood that variations and modifications can be effected within the spirit and scope of the invention.

What is claimed is:

1. An imaging member comprising at least one image receiving layer and an integral base material comprising at least one polyester layer and an upper surface layer comprising a polyester or polyolefin polymer and a bluing tint wherein said integral base material has a spectral transmission of greater than 90%, wherein said image receiving layer comprises an ink jet receiver layer.

2. The imaging member of claim 1 wherein said integral base material is oriented.

3. The imaging member of claim 1 wherein said upper polymer layer comprises at least one polyethylene layer.

4. The imaging member of claim 3 wherein at least one layer below said polyethylene containing layer comprises a charge control agent having an electrical resistivity of less than $10^{11}$ ohms per square.

5. The imaging member of claim 1 wherein said member further comprises at least one subbing layer.

6. The imaging member of claim 1 wherein said member comprises at least one image receiving layer on each of the top and bottom of said member.

7. The imaging member of claim 6 wherein said integral base material has a bottom subbing layer.

8. The imaging member of claim 1 wherein said imaging member has a thickness of between 76 and 256 µm.

9. The imaging member of claim 1 wherein said upper polymer layer comprises polyester.

10. The imaging member of claim 1 wherein said integral base material comprises optical brightener.

11. The imaging member of claim 1 wherein said integral base material is substantially free of inorganic pigments.

12. The imaging member of claim 1 wherein said imaging member further comprises a bottom image receiving layer.

13. The imaging member of claim 1 wherein said integral base material comprises a bottom layer of polyethylene.

14. The imaging member of claim 1 wherein said integral base material comprises a top integral polymer layer of polyester and a gel subbing layer is on top of said integral polymer layer of polyester.

15. An imaging member comprising at least one image receiving layer and an integral base material comprising at least one polyester layer and an upper surface layer comprising a polyester or polyolefin polymer and a bluing tint wherein said integral base material has a spectral transmission of greater than 90%, wherein said image receiving layer comprises a thermal dye transfer image receiving layer.

16. The imaging member of claim 15 wherein said integral base material is oriented.

17. The imaging member of claim 15 wherein said upper polymer layer comprises at least one polyethylene layer.

18. The imaging member of claim 15 wherein said member further comprises at least one subbing layer.

19. The imaging member of claim 15 wherein said member comprises at least one image receiving layer on each of the top and bottom of said member.

20. The imaging member of claim 15 wherein said upper polymer layer comprises polyester.

21. The imaging member of claim 15 wherein said integral base material comprises optical brightener.

22. The imaging member of claim 15 wherein said integral base material is substantially free of inorganic pigments.

23. The imaging member of claim 15 wherein said integral base material comprises a top integral polymer layer of polyester and a gel subbing layer is on top of said integral polymer layer of polyester.

24. An imaging member comprising at least one image receiving layer and an integral base material comprising at least one polyester layer and an upper surface layer comprising a polyester polymer and a bluing tint wherein said integral base material has a spectral transmission of greater than 90%.

25. The imaging member of claim 24 wherein said integral base material is oriented.

26. The imaging member of claim 25 wherein said image receiving layer comprises an electrophotographic image receiving layer.

27. The imaging member of claim 24 wherein said member further comprises at least one subbing layer.

28. The imaging member of claim 24 wherein said member comprises at least one image receiving layer on each of the top and bottom of said member.

29. The imaging member of claim 28 wherein said integral base material has a bottom subbing layer.

30. The imaging member of claim 24 wherein said integral base material comprises optical brightener.

31. The imaging member of claim 24 wherein said integral base material is substantially free of inorganic pigments.

32. The imaging member of claim 24 wherein said imaging member further comprises a bottom image receiving layer.

33. The imaging member of claim 24 wherein at least one layer below said polyethylene containing layer comprises a charge control agent having an electrical resistivity of less than $10^{11}$ ohms per square.

34. The imaging member of claim 24 wherein said integral base material comprises a top integral polymer layer of polyester and a gel subbing layer is on top of said integral polymer layer of polyester.

35. The imaging member of claim 24 wherein said imaging member has a thickness of between 76 and 256 µm.

36. The imaging member of claim 24 wherein said image receiving layer comprises a printing ink image receiving layer.

* * * * *